June 25, 1946.  W. P. COUSINO  2,402,805
PLASTIC INJECTION APPARATUS AND METHOD
Filed Jan. 8, 1943  2 Sheets-Sheet 2

INVENTOR
WALTER P. COUSINO
BY
ATTORNEYS

Patented June 25, 1946

2,402,805

UNITED STATES PATENT OFFICE 2,402,805

PLASTIC INJECTION APPARATUS AND METHOD

Walter P. Cousino, Detroit, Mich., assignor to Chrysler Corporation, Highland Park, Mich., a corporation of Delaware Application January 8, 1943, Serial No. 471,693

28 Claims. (Cl. 18—30)

This invention relates to an improved plastic injection apparatus and method.

More particularly the invention pertains to plastic injection apparatus and method by which either thermosetting or thermoplastic materials may be injected under pressure into a mold or through an extruding die.

One of the main objects of the invention is to provide apparatus by which a continuous discharge of a large variety of material in diverse physical states may be produced under relatively high pressures.

Another object of the invention is the provision of apparatus of this kind which is adapted to either continuously discharge under pressure solidifiable materials for extruding operations or intermittently discharge the same for molding operations.

Further objects of the invention are to provide apparatus of this character which is adapted to discharge under pressure plastic molding and extruding compounds having a large inert filler content comprising materials such as fiber, wood pulp comminuted fabric, mineral and like filler materials; to provide plastic injecting apparatus which is particularly adapted for injecting thermosetting plastic compounds for either continuous or intermittent molding or extruding operations and by which may be injected compounds having a relatively large proportion of reclaimed completely or partially set thermoplastic material and to provide apparatus of this kind from which may be injected charges of plastic molding or extruding compound having a large variety of particles of mixed sizes.

A still further object of the invention is the provision of relatively small size plastic injecting apparatus which is adapted to operate continuously throughout a sustained discharge period in order to produce comparatively large extruded or molded parts.

Additional objects of the invention are to provide in apparatus of this kind a screw type pressure creating unit which is not dependent upon friction between the material operated on and surfaces of the unit in order to propel the material axially of the screw, and which therefore does not subject the material to excessive friction created heat; to provide means in a pressure creating unit of this character for positively preventing rotating of the material with the screw upon the attainment of a back pressure in the unit; to provide a screw type pressure creating unit of this kind which requires the utilization of relatively few turns of the thread of the screw in the chamber thereof at which pressure is created and to provide a pressure creating unit of this character which is capable of placing thermosetting plastic compounds under extremely high pressure without subjecting it to friction created heat of an order which would cause it to set up in the pressure unit while the machine is operating or between operations thereof.

A further object of the invention is to provide a heating chamber between the pressure creating unit and the outlet nozzle of the plastic injecting apparatus in which is disposed a self-centering spreader that rotates with the screw of the pressure unit in order to effectively bring the material being injected into heat conducting contact with the walls of the heating chamber.

Other objects of the invention are to prevent setting up of thermosetting plastic compounds in the heating chamber and outlet nozzle of the apparatus during the interim between molding or extruding discharges of such compounds; to accomplish this purpose without significantly varying the temperature of the heating chamber and nozzle or converting the plastic compound contained therein to a less plastic or less flowable state by reducing the pressure applied on the plastic compound contained in the apparatus, between discharges therefrom, below the value at which the compound sets at the temperature at which it is maintained during normal molding or extruding operations, to provide an escapement orifice leading from the nozzle passage through which plastic may flow to atmosphere in order to reduce the pressure in the apparatus; and to provide a two-way valve mechanism which simultaneously closes and opens the escapement orifice as the discharge nozzle passage is opened and closed respectively.

Further objects of the invention are to provide injection apparatus of this kind which is so shiftably mounted as to bring the discharge nozzle outlet thereof into and out of sealed filling relationship with a mold or die by shifting movement and which is adapted to shift out of engagement with the mold under the action of back pressure when the mold is filled and discharge of plastic is to be discontinued, to provide for a relative shifting movement of this kind between the mold and discharge nozzle which accommodates the flow of a film of plastic material between surfaces of the mold and nozzle which normally contact during mold filling operations in order to heat insulate the nozzle from the mold after the latter is filled; and to provide improved control apparatus for automatically discontinuing the drive of the discharge mechanism when the injecting apparatus is so shifted under the action of back pressure created upon filling of the mold and which simultaneously closes the nozzle discharge passage and opens the escapement orifice.

A still further object of the invention is to provide improved temperature control apparatus by which the heating chamber is accurately maintained within close limits of a predetermined temperature.

An illustrative embodiment of the invention is shown in the accompanying drawings in which.

In the form of the invention illustrated in the drawings, the improved plastic apparatus comprises a base structure 10 on which is mounted one of a pair of complementary mold parts 11 and 12. The mold part 12 is shiftable relative to the stationary mold part 11 and is provided with mechanism for moving it into and out of mating relationship with respect to the mold part 11. This mechanism may be constructed and designed in accordance with conventional mold operating structures, but for the purpose of illustration there is shown in the drawings a cylinder 13 having a piston 14 slidably mounted therein and connected with the shiftable die part 12 by a piston rod 15. The cylinder 13 is provided with fluid pressure inlets 16 by which fluid under pressure may be selectively admitted to respectively opposite sides of the piston 14 in order to open and close the mold.

Figures 1, 2:
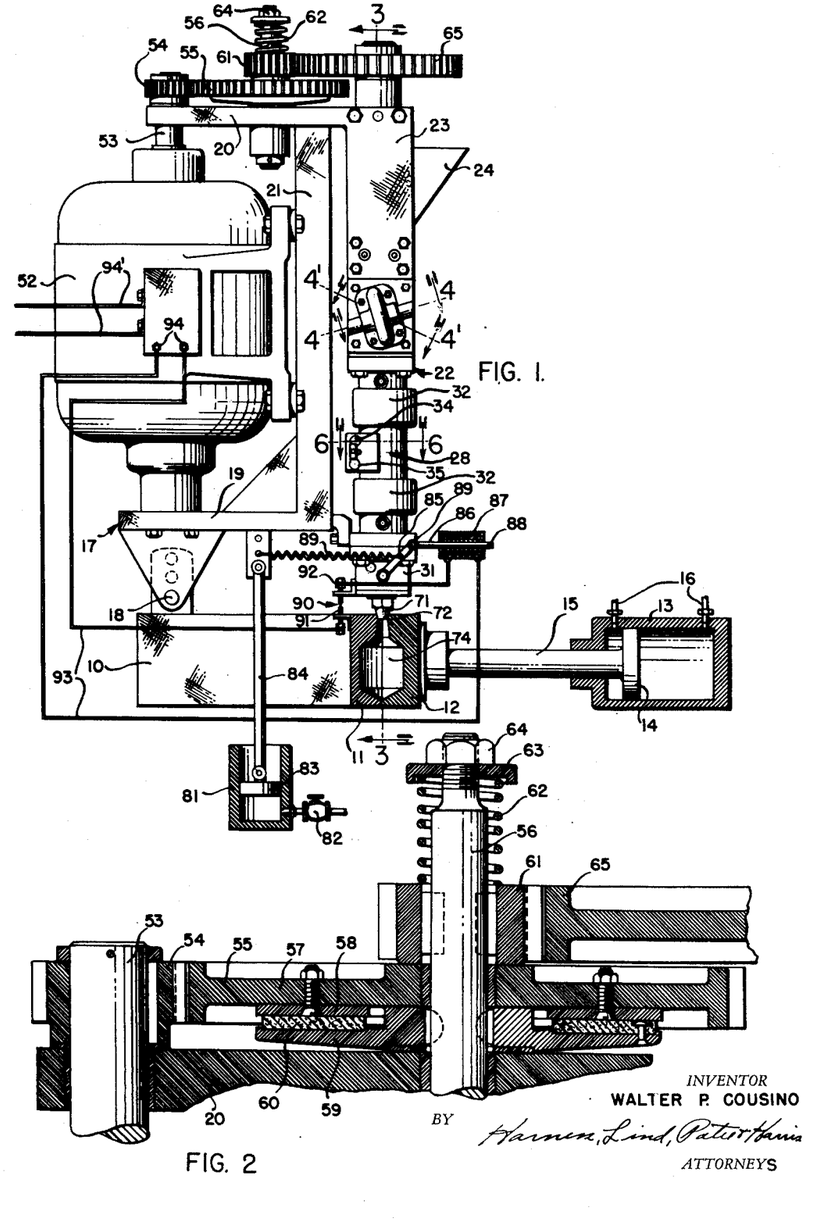
Fig. 1 is an elevational view, partly in section, of plastic injecting apparatus embodying the invention.
Fig. 2 is an enlarged fragmentary sectional view of the drive transmitting mechanism with which the apparatus illustrated in Fig. 1 is provided.

A frame structure, generally designated by the numeral 17 is pivotally mounted at 18 upon the base 10, as illustrated in Fig. 1. This frame comprises upper and lower horizontal flanges 19 and 20, respectively which are connected by a vertically upstanding post 21. The axis of the pivotal connection 18 between the base 10 and the frame 17 is so disposed as to accommodate rotative shifting of the plastic injecting apparatus, hereinafter described, with respect to the mold.

Mounted on the right side of the post 21, as viewed in Fig. 1, is a tubular housing generally designated by the numeral 22 having an upper hollow section 23 provided with an inlet opening through which plastic compound may be admitted to the interior of the apparatus. A hopper 24, which registers with the inlet opening of the upper section 23, is provided for facilitating continuous supplying of plastic compound to the apparatus.

Immediately adjacent the upper inlet section 23 of the apparatus is a compression unit which comprises a rectangular block 25 having a cylindrical bore 26 therein. The upper end portion 27 of the bore 26 is flared to accommodate the feeding of plastic compound from the interior of the inlet section 23 to the main length of the bore 26.

Communicating with the lower or discharge end of the bore 26 is a heating chamber generally designed by the numeral 28 comprising an inner sleeve 29 and a spaced outer shell 30. Plastic placed under pressure by mechanism hereinafter set forth, passes through the interior of the inner sleeve 29 into a discharge nozzle, having a body portion generally designated by the numeral 31. The heating chamber 28 may be heated by any suitable means, electric heating coils 32 being shown in the drawings as an illustration of suitable heating elements. Either a heating or a cooling medium may be circulated through the space 33 between the inner sleeve 29 and the outer shell 30. If desired, the entire heat supply may be applied by circulating a heating medium through this space or part of the heat may be so applied while the remaining portion is generated by electrical heating coils 32. When it is required that the temperature of the heating chamber 28 be accurately controlled, the heat may be supplied by the coils 32 or equivalent means and a cooling medium circulated through the space 33, each under the control of a suitable thermostatic element such as are illustrated at 34 and 35 in Fig. 1. Each thermostatic element 34 and 35 includes a fixed contact 36' and a deflectable bimetallic contact 37'. The contacts of the thermostatic elements 34 and 35 have terminals 38' and 39' for connection in a heating coil and cooling medium control circuits (not shown) respectively. A spreader 40' is suspended from the lower end of the screw 36 for rotation with the latter to assure intimate contact between the plastic compound and the walls of the heating chamber. This spreader has a tapered end 41' which extends into the nozzle passage, hereinafter described, and conforms in shape with the contour of this passage.

The compressing unit includes a conveyer type screw or worm member 36 which extends through part of the upper inlet chamber and through the bore 26 of the block 25. The screw 36 is suspended at its upper end from a spindle 37 and journalled in a bearing 38 which is disposed in an opening 39 formed in the upper end wall 40 of the inlet section 23. The spindle 37 has a radial flange 41 spaced from the inner side of the wall 40. A suitable thrust bearing member 42 is disposed between the flange 41 and the internal side of the wall 40. The upper end of the screw 36 is provided with an axially extending shank 43 of reduced diameter which is received in a bore 44 provided in the lower end portion of the spindle 37. The shank 43 and spindle 37 are secured against relative rotation by a pin 45.

Formed in respectively opposite sides of the block 25 are fragmentary cylindrical slots 44 in which are disposed rotatable gear-like dam members generally designated by the numeral 45 having lobe-shaped teeth 46 meshed with the thread of the screw 36. Each dam member comprises a central disc portion 47 about which the lobe-shaped teeth 46 are disposed and a pair of oppositely extending hub portions 48 which are journalled in bearings 49 mounted in recesses formed in the side walls of the block 25 and located a fixed distance from the axis of the screw 36. The bearings 49 are held in place by recessed bearing cap elements 50 which have an intermediate arcuate or substantially semi-circular housing portion 51 surrounding the portions of the rotatable dam members 45 which project outwardly beyond the opposite side faces of the block 25. The combined bearing caps and housing portions 50 and 51 are clamped on the opposite side faces of the block 25 in pressure sealing relationship so as to maintain the spaces within which the rotatable dams 45 operate in sealed communication with the bore 26. The inner surfaces of the slots 44 and recesses of the bearing caps 50 and 51 have a shape corresponding to the transverse cross section of the teeth 46 of the dam members 45 and fit said dam members sufficiently close to substantially preclude the flow of material from the bore 26 into said recesses, as will be apparent from Figs. 3 and 4. The hub portions 48 of the rotatable dam on one side of the screw 36 has an axis which is disposed in a plane inclined with respect to the rotative axis of the screw to correspond with the inclination of the portion of the groove of the latter with which it meshes and the hub portion 48 of the rotatable dam on the opposite side of the screw 36 has an axis which is disposed in a plane having an opposite inclination with respect to the rotative axis of the screw to correspond with the inclination of the portion of the groove of the screw with which it meshes. During rotation of the latter the gear-like dam elements 45 are simultaneously rotated about the axis of the hub members 48. The screw 36 and rotatable dams 45 are thus meshed in worm and gear relationship and the lobe-shaped teeth 46 are so shaped as to conform with the inclined cross sectional shape of the thread of the screw 36.

Figures 3, 4, 5, 6, 7:
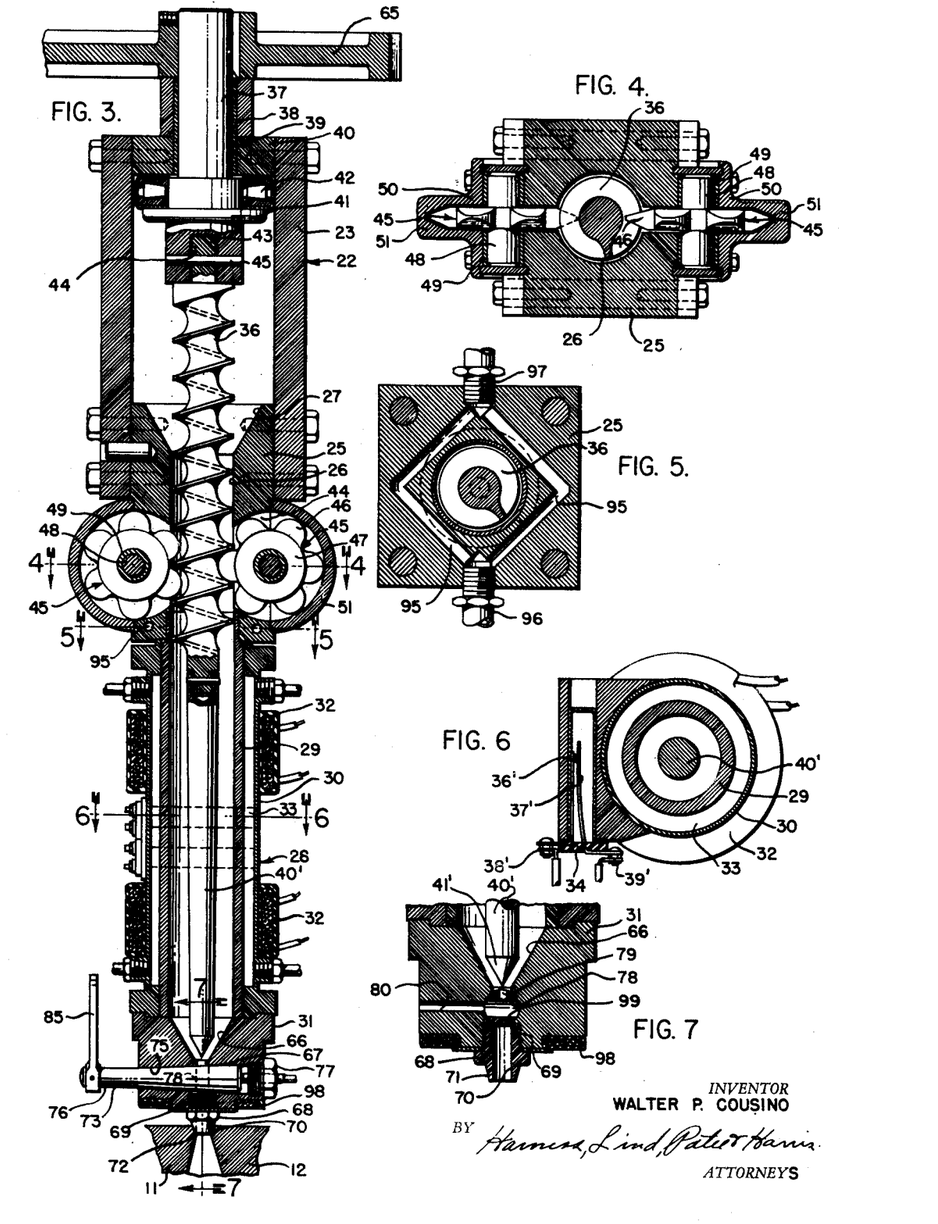
Fig. 3 is a central vertical sectional view taken on the line 3—3 of Fig. 1.
Fig. 4 is a transverse sectional view taken on inclined planes indicated by the lines 4—4 and 4'—4' of Fig. 1.
Fig. 5 is a transverse sectional view taken on the line 5—5 of Fig. 3.
Fig. 6 is a transverse sectional view taken on the line 6—6 of Fig. 3.
Fig. 7 is a fragmentary longitudinal sectional view taken on the line 7—7 of Fig. 3.

The injecting apparatus is provided with driving mechanism which may include a driving member of any desired type such as the electric motor 52 which is mounted on the post 21 and disposed between the flanges 19 and 20. The motor 52 has a shaft 53 on which is fixed a pinion 54. The pinion 54 is meshed with an idler gear 55 rotatably mounted on a shaft 56. The web portion 57 of the idler gear 55 is provided with a clutch element 58 which is held in frictional engagement with the driven clutch element 59 extending radially from and rigidly fixed to the shaft 56. Either the driving or driven clutch elements 58 or 59 may be provided with suitable clutch facing material 60 which, in the illustration shown in Fig. 2, is attached to the driven clutch element 59. A pinion 61 is splined on the shaft 56 and urged downwardly, as viewed in Fig. 2, against the hub of the idler gear 57 by a spring 62 bearing between the pinion 61 and a washer 63 held against outward movement from a reduced threaded end portion of the shaft 56 by a nut 64. The spring 62 serves to force the friction elements together in operative relationship. The pinion 61 is meshed with a gear 65 which is keyed to the spindle 37, as illustrated in Fig. 3. During normal operation of the driving mechanism, rotative power is transmitted from the motor shaft 53 through the gear 55, clutch elements 58 and 59, shaft 56 and pinion 61, gear 65 and spindle 37 to the screw 36. In the event rotation of the screw 36 is excessively opposed, slippage occurs between the clutch elements 58 and 59 thus preventing the driving mechanism from injury.

During rotation of the screw 36 and rotatable dams 45 which are meshed therewith in worm and screw relationship, the plastic compound is propelled by the thread of the screw from the inlet chamber of the upper section 23 of the apparatus into the bore 26 of the compressing unit. As the plastic so conveyed reaches the locations of the rotatable dams 45, the successive lobes 46 thereof cut into the plastic compound content of the groove or thread of the screw and prevent the compound in the portions of the thread of the screw below the dams 45 from turning with the screw. Therefore, the existence of friction between the wall of the bore 26 and the plastic compound is not relied upon to mainly oppose turning of the compound with the screw. The compound can thus be propelled axially of the screw under extremely high pressure without an accompanying frictionally created heat of an order which would tend to excessively raise the temperature of the plastic compound or to prematurely cure it to a set or solidified state. This is accomplished without losing substantially any of the compression to which the plastic compound is subjected, for any of the plastic compound which is removed from the bore between the teeth 46 of the gears is returned to the bore at a location therein which is spaced from the inlet end of the bore toward the outlet end thereof a distance corresponding to several complete turns of the thread of the screw which are embraced by the wall of the bore 26. The compound which is carried around in the spaces between the teeth is thus returned to the bore at a zone thereof from which its free flow to the bore inlet is opposed by the thread of the screw in all positions of the latter, as well as by the plastic material contained in the groove of the thread.

The nozzle 31 has a tapered bore portion 66 communicating at its upper end with the interior of the inner sleeve 29 of the heating chamber 28 and at its lower end with a discharge passage 67 of relatively small cross-section. A nozzle fitting 68 is threaded in a counter bore 69 provided in the lower extremity of the nozzle 31. The fitting 68 has a central passage 70 communicating with the nozzle discharge passage 67 and constituting an external continuation thereof. Provided on the exterior lower end portion of the fitting 68 is a convexed surface 71 which is adapted to mate with a corresponding concaved surface 72 provided at the entrance of the inlet passage 73 located between the complementary mold parts 11 and 12 and leading to the mold cavity 74. The nozzle 31 has a tapered bore 75 which intersects the discharge passage 67 and in which is rotatably journalled a tapered valve element 76. The valve element is held against rightward movement by a plug 77 threaded in the large end of the bore 75. This valve element is provided with a diametrically extending port 78 which, when the valve element is in the position shown in Fig. 3, is adapted to connect the discharge passage 67 of the nozzle body portion 31 with the passage 70 of the nozzle fitting 68 in order to accommodate discharge of plastic material under pressure from the interior of the heating chamber. When the valve element is rotated 90 degrees from the position shown in Fig. 3 to the position shown in Fig. 7, the flow of plastic material from the heating chamber to the discharge passage section 70 of the nozzle fitting 68 is obstructed. In this position of the valve, however, a radial bore 79 provided in the valve element 76 accommodates a limited flow of plastic material from the heating chamber to the port 78 in the valve element 76 from which it may escape through an escapement passage 80 provided in the nozzle body portion 31 which communicates with the port 78 of the valve element 76 when the latter is in the position shown in Fig. 7.

The injecting apparatus may be manually or mechanically rotated about the axes of the pivotal connection 18 in order to bring the nozzle fitting 68 into and out of filling relationship with respect to the mold. For the purpose of illustrating suitable mechanism to accomplish this action there is shown in Fig. 1 a cylinder 81 provided with suitable connections 82 for admitting and exhausting fluid medium under pressure thereto and therefrom respectively. A piston 83 reciprocably mounted in the cylinder 81 is pivotally connected by a piston rod 84 with the frame 17 on the right side of the pivotal connection 18. It will be seen that the injecting apparatus may be shifted into and out of mold filling position by reciprocation of the piston 83 in the cylinder 81.

The operation of the screw 36 and valve element 76 may be manually controlled, if desired, by a suitable switch (not shown) for the motor circuit and by manipulation of the valve element 76 which is provided with a control lever 85. There is, however, diagrammatically shown in Fig. 1 an automatic control system for stopping and starting the screw driving mechanism and opening and closing the valve of the nozzle automatically and in a predetermined timed relationship. This system comprises a solenoid generally designated by the numeral 86 having a coil 87 in which is shiftably mounted a solenoid core element comprising a bar 88. The bar 88 is suitably pivotally connected at 89 to the valve control lever 85. The lever 85 is normally urged toward its valve closing position by a spring 89. The switch generally designated by the numeral 90 is provided for closing an electric circuit through the coil 87 of the solenoid and to the motor 52 in the manner hereinafter set forth. The switch comprises a fixed contact 91 mounted on the base structure 10 and a movable contact 92 carried by the nozzle body portion 31. The movable contact 92 is adjustable to bring it into engagement with the fixed contact 91 when the convexed surface of the nozzle fitting 68 is properly seated upon the concaved seat 72 of the mold. The contacts 91 and 92 and the coil 87 are suitably electrically connected by conductors with a control circuit 93 and with an electrically operable motor switch 94 in a power line 94' to simultaneously energize the solenoid 86, so as to rotate the valve control lever 85 clockwise from its valve closing position and energize the motor 52 when the control circuit is closed by engagement of the movable and fixed contacts 92 and 91 respectively. This operation causes the screw 36 to be driven and opens the valve element 76 in order to produce a flow of plastic material under pressure into the mold. When the mold is filled, the back pressure applied on the nozzle fitting 68 shifts the apparatus pivotally about the axis of the connection 18 thereby separating the fixed and movable contacts 91 and 92, discontinuing the supply of current to the motor 52 and to the coil 87, whereupon the spring 89 moves the valve element 76 to its closed position. As the convexed surfaces of the nozzle fitting 68 are lifted slightly from the concaved seat 72 in the mold 11—12 a film of plastic material flows between these surfaces thereby heat insulating the nozzle fitting 68 as well as the nozzle body portion 31 and heating chamber 28 from the mold.

The foregoing apparatus is adapted to discharge, for molding or extruding purposes, plastic compounds of the thermosetting and thermoplastic types as well as compounds such as those used in the rubber industry which solidify or convert from a flowable plastic state to a more rigid state by a vulcanizing reaction when heated to a predetermined temperature.

In operation of the apparatus to fill molds with plastic compounds of the type which set or solidify when heated either under pressure or in the absence of pressure, the following procedure takes place. The compound to be injected into a mold or through an extruding die for that matter, is introduced into the hopper 24, fed to the compressing unit by the thread of the screw 36 at the upper end portion thereof and placed under extremely high pressures in the heating chamber 28 by the foregoing operation of the screw 36 and rotatable dams 45. When operating upon thermosetting material the temperature of the heating chamber is so controlled by thermostatic means 34 and 35 heretofore described, as to maintain the plastic compound at a suitably soft consistency to enable it to flow through the discharge passage 70 of the nozzle 68 and into the mold cavity 74. Some heat is supplied to the plastic compound charge by the mechanical compressing action of the screw 36 and rotatable dams 45, and when this is insufficient to bring the temperature of the plastic in the heating chamber to a desired value, additional heat is supplied thereto by the heating coils 32. In the event the temperature in the heating chamber 28 exceeds a desired value, the latter may be cooled by circulation of a cooling medium through the space 33 between the walls 29 and 30 of the heating chamber.

In order to lessen conductivity of the heat from the heating chamber to the compressing unit, the rectangular block 25 is provided with passages 95 for accommodating the circulation of a cooling medium through the lower end portion of the rectangular block. Such cooling medium may be introduced into the passages 95 through a fitting 96 and exhausted therefrom through a fitting 97 which fittings are connected to suitable conduits.

Plastic compound in suitably softened condition may be continuously discharged in the foregoing injecting apparatus and passed through extruding dies to produce articles of desired lengths. When thermosetting plastic compounds are injected from the apparatus into a mold, the mold is preferably heated to a temperature above that maintained in the heating chamber so that the plastic compound is further softened in order to facilitate its flow under pressure into all of the recesses and irregularities of the surfaces of the mold cavity 74. When the mold 11—12 is filled and the nozzle fitting 68 is raised from its seat 72 on the mold, driving of the screw 36 is either manually or automatically discontinued and the valve element 76 is moved to its closed position thus connecting the port 79 of said valve element with the escapement passage 80 of the nozzle body portion 31. The plastic in the mold is nevertheless held under pressure while it is either completely or partially cured by heat supplied to the mold in any suitable manner in accordance with conventional plastic molding practice. The plastic occupying the mold passage 73 which is relatively constricted, sets rapidly at the temperature of the mold and forms a plug which assists in retaining the plastic in the mold cavity under compression and inasmuch as the nozzle fitting 68 is lifted but slightly from the mold by the back pressure exerted on the nozzle when the mold is filled and since the space between the lifted nozzle fitting and the mold is filled with plastic material which oozes between the convexed and concaved surfaces 71 and 72 of the nozzle fitting and mold entrance respectively, substantial reduction in the pressure on the plastic in the mold is guarded against. During the period the plug is being cured in the mold passage 73, the imperforated portion 99 of the valve element prevents the back flow of plastic from the passage 73 and from the mold so as to retain the plastic in the mold under compression while the plug is being formed.

The pressure on the plastic compound in the heating chamber is relieved by the flow of plastic compound through the escapement passage 80 thus guarding against unintended setting of the plastic compound in the heating chamber and in the outlet discharge passage 67 of the nozzle body portion 31. The lifting of the nozzle fitting 68 from the entrance of the mold 11—12 accommodates sufficient reduction in the pressure of plastic compound remaining in the discharge passage section 70 of the nozzle fitting to guard against unintended setting of the plastic compound in this passage section. The heat insulation afforded by the film of plastic compound which oozes between the convexed and concaved surfaces 71 and 72 of the nozzle fitting 68 and mold entrance respectively, further guards against conversion of the plastic compound in the passage section 70 to a set condition between successive molding operations. Whether the apparatus is actuated manually or automatically as herein described, when operating upon materials which solidify by heating, the pressure in the heating chamber 28 and passages leading therefrom should be relieved, preferably by allowing plastic compound to escape through the passage 80, as soon as the mold is filled in order to guard against unintended setting of the compound.

When operating upon certain plastic compounds, it may be desirable to heat the nozzle body portion 31 at its outlet extremity. This may be accomplished by applying a heating coil 98 to the lower end of the nozzle body portion 31 as shown in Fig. 7. The heating coil 98 may be connected in the same electrical circuit as that in which the heating coils 32 are connected or in an independent circuit.

When operating upon thermoplastic material, the latter may be heated in the same manner as employed in connection with injecting thermosetting material but the mold will be cooled. In this case, it is unnecessary to provide for an escapement of plastic material when the valve 76 is in closed position. Elimination of the escapement of plastic while the valve is closed may be effected by so rotating the valve to close it as to bring the imperforated portion 99 of the valve element into closing relationship with respect to the discharge passage 67. This operation would, it is obvious, require rotation of the valve element control lever 85 from the position shown in Fig. 1, in a direction opposite to that in which it was rotated to bring the port 79 to the position shown in Fig. 7. A film of thermoplastic material forced between the convexed and concaved surfaces of the nozzle fitting and mold respectively when the mold is filled serves to heat insulate the nozzle fitting from the cooled mold and thus prevent unintended solidification of the plastic compound in the nozzle. Although the injecting apparatus has been shown and described as being disposed in a vertical position it should be understood that all the above mentioned advantages may be obtained when the apparatus is arranged horizontally.

The foregoing apparatus is particularly adapted to continuously discharge relatively large quantities of plastic compound or to intermittently discharge the same for injection into a mold. By virtue of the above mentioned precautions including the control of the temperatures applied as well as the pressure to which the plastic is subjected when not being discharged from the apparatus, clogging of the passages of the apparatus including the heating chamber thereof by unintended setting of the plastic compound is effectively guarded against.

Although but one specific embodiment of the invention is herein shown and described, it will be understood that various changes in the sequence of operations, steps and materials employed may be made without departing from the spirit of the invention.

It is claimed:

1. Apparatus for injecting heat curing plastic compound into a mold having an inlet opening comprising an injecting unit including a discharge nozzle and pressure creating means for forcing plastic compound through said nozzle under pressure, said injecting unit including controllable driving mechanism for said pressure creating means, means shiftably mounting said injecting unit for bringing said nozzle into and out of mold filling engagement with respect to said mold inlet opening, said injecting unit being shiftable under back pressure applied thereon by said plastic compound when said mold is filled to accommodate the flow of a film of plastic compound between said nozzle and mold for interrupting the direct conduction of heat from said mold to said nozzle, and a control system for said driving mechanism including a member responsive to movement of said injecting unit by said back pressure for discontinuing operation of said pressure creating means when said mold is filled.

2. Apparatus for injecting heat curing plastic compound into a mold having an inlet opening comprising an injecting unit including a discharge nozzle and pressure creating means for forcing plastic compound through said nozzle under pressure, said injecting unit including driving mechanism for said pressure creating means, means shiftably mounting said injecting unit for bringing said nozzle into and out of mold filling engagement with respect to said mold inlet opening, said injecting unit being shiftable under back pressure applied thereon by said plastic compound when said mold is filled, and a control system for said driving mechanism including a member responsive to movement of said injecting unit by said back pressure for discontinuing operation of said pressure creating means when said mold is filled.

3. In apparatus for injecting heat curable plastic compound into a mold having an inlet opening; an injecting unit comprising a nozzle provided with a discharge passage and a communicating escapement orifice, pressure creating apparatus in said injecting unit for forcing plastic compound through said nozzle under pressure, mechanism for driving said pressure creating apparatus, means shiftably mounting said injecting unit for bringing said nozzle into and out of mold filling engagement with respect to said mold inlet opening, said injecting unit being shiftable under back pressure applied thereon when said mold is filled, valve mechanism in said nozzle for simultaneously closing said escapement orifice when said discharge passage is opened and opening said escapement orifice when said discharge passage is closed, and a control system for said driving and valve mechanisms including means responsive to movement of said injecting unit by said back pressure for simultaneously discontinuing operation of said driving mechanism and actuating said valve mechanism to close said discharge passage and open said escapement orifice.

4. In apparatus for injecting heat curable plastic compound into a mold having an inlet opening; an injecting unit comprising a nozzle provided with a discharge passage and a communicating escapement orifice, pressure creating apparatus in said injecting unit for forcing plastic compound through said nozzle under pressure, mechanism for driving said pressure creating apparatus, valve mechanism in said nozzle for simultaneously closing said escapement orifice when said discharge passage is opened and opening said escapement orifice when said discharge passage is closed, and a control system for said driving and valve mechanisms including means actuatable by pressure on the plastic in said injecting unit when said mold is filled for simultaneously discontinuing operation of said driving mechanism and actuating said valve mechanism to close said discharge passage and open said escapement orifice.

5. The method of molding heat curing plastic compound by injecting successive mold filling charges of said compound from an injecting unit having pressure creating mechanism and having a discharge passage for conveying it to a mold and an escapement orifice communicating therewith, which comprises the steps of heating said compound in said injecting unit to a state of flowable plasticity but below the temperature at which it cures when not under pressure, bringing said discharge passage into communication with the inlet of said mold, operating said pressure creating mechanism while said escapement orifice is closed and said passage is open to force said compound through said passage until said mold is filled, discontinuing operation of said pressure creating apparatus and substantially simultaneously closing said passage against back flow of plastic from said mold and opening said escapement orifice in order to relieve the pressure on the compound in said injecting unit and to guard against curing of said compound in said apparatus while said nozzle is retained in obstructing relation to the back flow of plastic from said mold, and curing said compound in said mold.

6. An apparatus for injecting a moldable compound into a mold having an inlet opening, an injecting unit comprising a heating chamber for heating said compound to a state of flowable plasticity, a nozzle having a discharge passage leading from said heating chamber, said nozzle having an end portion engageable in said inlet opening in sealing relation to wall portions thereof, apparatus for forcing said compound through said passage and into said mold under pressure, mechanism for driving said apparatus, means relatively shiftably mounting said injecting unit and mold for bringing said nozzle into and out of mold filling relationship with respect to said mold inlet opening, said injecting unit and mold being relatively shiftable under back pressure exerted by said compound when said mold is filled for accommodating the flow of a heat insulating layer of the latter between said nozzle and said wall portions of said inlet opening, and a control system for said driving mechanism including means responsive to relative movement of said mold and injecting unit for discontinuing operation of said driving mechanism.

7. In apparatus for injecting a moldable compound into a mold having an inlet opening, an injecting unit comprising a nozzle provided with a discharge passage, pressure creating apparatus for forcing said compound through said passage under pressure, mechanism for driving said pressure creating apparatus, means relatively shiftably mounting said injecting unit and mold for bringing said nozzle into and out of mold filling relationship with respect to said mold inlet opening, said injecting unit and mold being relatively shiftable under back pressure exerted by said compound when said mold is filled, and a control system for said driving mechanism including means responsive to relative movement of said mold and injecting unit by said back pressure for discontinuing operation of said driving mechanism.

8. The method of molding heat curing plastic compound which comprises the steps of yieldably urging together a nozzle and mold having interfitting nozzle and mold inlet surfaces, forcing said plastic compound in a heated and plastic state through said nozzle and into said mold until the latter is filled, displacing said nozzle surface from said mold by pressure applied thereon by said plastic compound when said mold is filled sufficiently to accommodate the formation of a heat insulating layer of plastic between said surfaces, discontinuing the flow of plastic to said nozzle, and curing the contents of said mold by continuation of the heating thereof.

9. The method of molding heat curing plastic compound which comprises the steps of yieldably urging together a nozzle and mold inlet surface, forcing said plastic compound through a heating chamber and through the discharge passage of said nozzle under pressure until the cavity of said mold is filled, displacing said nozzle surface from said mold inlet surface to accommodate the formation of a heat insulating layer of plastic between said surfaces, substantially simultaneously discontinuing the application of pressure on the plastic in said chamber and obstructing the back flow of plastic from said mold inlet through said nozzle discharge passage while maintaining the pressure in said mold inlet and cavity until the plastic compound in said mold inlet at least partially solidifies in advance of solidification of the contents of said mold cavity, and curing the composition in said mold cavity thereafter.

10. In apparatus for injecting a moldable compound into a mold having a mold cavity and an inlet opening leading thereto, an injecting unit comprising a nozzle provided with a discharge passage, pressure-creating apparatus for forcing said compound through said passage into said cavity under pressure, means relatively shiftably mounting said injecting unit and mold for bringing said nozzle into and out of mold-filling relationship with respect to said mold inlet opening, said injecting unit and mold being relatively shiftable under back pressure exerted by said compound when said mold is filled, a valve for interrupting the flow of said compound from said nozzle to said cavity, and a control system for said valve including means responsive to relative movement of said mold and injecting unit by said back pressure for closing said valve.

11. The method of molding heat-curing plastic compound which comprises the steps of yieldably holding a plastic discharge nozzle and mold inlet in engaged mold-filling relationship, injecting a mold-filling charge of said compound under pressure through a passage communicating with said nozzle and through a passage in said nozzle into said mold inlet from a source containing said compound in a plastic state, continuing the application of pressure on said source after said mold is filled and until the back pressure upon said nozzle displaces it slightly from the mold inlet to accommodate the formation of a heat-insulating film of said compound between said yieldably engaged nozzle and mold inlet, discontinuing said application of pressure on said source while retaining the plastic compound in said mold under pressure in order to guard against setting of said compound at said source and in said first-mentioned passage between successive mold-filling discharges, and heating said mold to cure the compound therein.

12. The method of molding heat-curing plastic compound which comprises the steps of yieldably holding a plastic discharge nozzle and the inlet of a heated mold in engaged mold-filling relationship, injecting a mold-filling charge of said compound under pressure through a passage communicating with said nozzle and through a passage in said nozzle into said mold inlet from a source of said compound under pressure, continuing the application of pressure on said source after said mold is filled and until the back pressure upon said nozzle displaces it from said mold inlet to accommodate the formation of a heat-insulating film of said compound between said yieldably engaged nozzle and mold inlet, discontinuing the application of pressure on said source substantially immediately after formation of said film, retaining said nozzle and film in back-flow obstructing relationship with respect to the plastic in said mold and mold inlet until a plug of said plastic compound solidifies in said inlet, removing said nozzle from said mold inlet, and heating said mold to cure the compound therein.

13. The method of molding heat-curing plastic compound which comprises the steps of yieldably holding a plastic discharge nozzle and the inlet of a heated mold in engaged mold-filling relationship, injecting a mold-filling charge of said compound under pressure through a passage communicating with said nozzle and through a passage in said nozzle into said mold inlet from a source of said compound under pressure, continuing the application of pressure on said source after said mold is filled and until the back pressure causes relative movement of said nozzle and mold to accommodate the formation of a heat-insulating film of said compound between said yieldably engaged nozzle and mold inlet, discontinuing the application of pressure on said source substantially immediately after formation of said film, retaining said nozzle and film in back-flow obstructing relationship with respect to the plastic in said mold and mold inlet, and heating said mold to cure the compound therein.

14. Apparatus for discharging material under pressure comprising housing means having a bore therein forming a pressure chamber provided at one end with an inlet for said material and with an outlet for the latter spaced axially of said bore, a rotatable screw in said bore having a conveyor-like worm thread extending through said bore between said inlet and outlet, mechanism for drivingly rotating said screw, the wall of said pressure chamber on opposite sides of said screw and between said inlet and outlet having externally closed arcuate recesses therein communicating with said bore at a location spaced from the inlet end of the latter a distance corresponding to more than one complete turn of the thread of said screw, whereby direct communication in an axial direction between said recesses and said inlet is prevented in all angular positions of said screw, and a gear-like idler member rotatably mounted in each of said recesses having an axis extending relatively transversely of the axis of said screw in fixed spaced relation thereto and having teeth-like elements meshed with the thread of said screw in worm and gear relationship, the inner surfaces of said arcuate recesses having a shape corresponding to the transverse cross section of said teeth-like elements and fitting said gear-like elements sufficiently close to substantially preclude the flow of material from said bore into said recesses, said teeth-like elements being adapted to successively cut into the material contents of the groove of said screw during rotation of said screw in order to positively hold said material against turning with said screw and to thus cause said material to be impelled by said screw axially of the latter.

15. Apparatus for discharging material under pressure comprising housing means having a bore therein forming a pressure chamber and having an inlet for said material and outlet for the latter spaced axially of said bore, a rotatable screw in said bore having a conveyor-like worm thread extending between said inlet and outlet, mechanism for drivingly rotating said screw, the wall of said bore having a laterally extending recess therein communicating with said bore at a location spaced from the inlet end of the latter a distance corresponding to more than one complete turn of the thread of said screw, whereby direct communication in an axial direction between said recess and said inlet is prevented in all angular positions of said screw, a substantially semi-circular hollow housing portion forming a closure for said recess, and a gear-like member rotatably mounted in said recess having an axis extending relatively transversely of the axis of said screw in fixed spaced relation thereto and having teeth-like elements meshed with the thread of said screw in worm and gear relationship and adapted to successively cut into the material contents of the groove of said screw during rotation of said screw in order to positively hold said material against turning with said screw and to thus cause said material to be impelled by said screw axially of the latter.

16. Apparatus for injecting plastic under pressure comprising housing means including substantially vertically aligned plastic compound receiving, compressing and heating chambers, respectively, arranged in the order named, said compression chamber including a substantially vertical bore therein and a laterally offset externally closed recess communicating with said bore at a location spaced from the inlet end of the latter, a nozzle having a discharge passage communicating with the outlet of said heating chamber, and means in said compression chamber for transferring the plastic compound from said receiving chamber and compressing said plastic compound into said heating chamber and forcing it through said discharge passage under pressure, said means comprising a single rotatable screw extending through said bore and axially into said compound receiving chamber and having a plurality of complete turns of the thread of said screw between the inlet end of said bore and the end of said recess adjacent said inlet end of said bore, whereby direct communication in an axial direction between said recess and said inlet end of said bore is prevented in all angular positions of said screw, and a rotatable gear-like element in said recess having teeth meshed with the thread of said screw in worm and gear relationship and adapted to be driven by said screw to bring said teeth successively into the groove of said screw during rotation of said screw to preclude the plastic compound content of said groove from rotating with said thread, said gear being mounted for rotation about an axis a fixed distance from the axis of said screw and being adapted to return plastic material carried by it to a zone of said bore from which free flow of such plastic material toward said inlet is obstructed by the thread of said screw in all angular positions of the latter in its path of rotative movement.

17. In combination, a forming device having an inlet for a heat curable plastic compound; and an apparatus for injecting a heat curable plastic compound into said inlet of said device, comprising a tubular housing having a plastic compound inlet at one end, a nozzle engaging said inlet of said forming device and having a normal discharge passage at the opposite end of said housing communicating with the interior of said forming device, a pressure creating unit in said housing for propelling said plastic compound under pressure through said housing and through said normal discharge passage into said forming device, said apparatus having a plastic compound escapement orifice leading from the interior thereof to the atmosphere at a location between said pressure creating unit and said nozzle, means for heating said plastic compound during its passage from said pressure creating unit to said nozzle, valve means for controlling the flow of plastic compound through said nozzle passage and from said escapement orifice, and mechanism for operating said valve means to open and close said escapement orifice as said passage is closed and opened, respectively, said mechanism including automatic switch means and a solenoid controlled by said switch means arranged to shift said valve means to open said escapement orifice and close said passage upon complete filling of said forming device and while said nozzle is still in pressure communicating relationship with respect to said inlet whereby to relieve the pressure on the plastic compound in said apparatus between intermittent discharges therefrom and to simultaneously oppose back flow of plastic compound from said forming device through said nozzle passage.

18. In combination, a forming device having an inlet for a heat curable plastic compound; and an apparatus for injecting a heat curable plastic compound into said inlet of said device, comprising a tubular housing having a plastic compound inlet at one end, a nozzle engaging said inlet of said forming device and having a normal discharge passage at the opposite end of said housing communicating with the interior of said forming device, said nozzle and said forming device being relatively movable to separate the same in response to back pressure acting on said nozzle after said forming device is completely filled, a pressure creating unit in said housing for propelling said plastic compound under pressure through said housing and through said normal discharge passage, said nozzle having an escapement orifice therein leading from said normal discharge passage and communicating with the atmosphere, a single valve element for controlling the flow of plastic compound from said passage and escapement orifice, said valve element having two operative positions and including two ports therein arranged to open and close said escapement orifice as said passage is closed and opened, respectively, and mechanism for operating said valve element including means responsive to said separatory movement of said nozzle and said forming device for closing said passage and opening said escapement passage while said nozzle is still in pressure communicating relationship with respect to said inlet of said forming device.

19. In combination, a forming device having an inlet for a heat curable plastic compound; and an apparatus for injecting a heat curable plastic compound into said inlet of said device, comprising a tubular housing having a plastic compound inlet at one end portion, a nozzle at the opposite end portion of said housing, said nozzle engaging the inlet of said forming device and having a normal discharge passage communicating with the interior of said forming device, said nozzle and said forming device being relatively movable to separate the same in response to back pressure acting on said nozzle after said forming device is completely filled, a pressure creating unit in said housing for propelling said plastic compound under pressure through said housing and through said normal discharge passage, said unit comprising a single rotatable screw having a conveyor-like thread and a gear-like element having teeth meshed with said thread in relative worm and gear relationship for positively holding said plastic compound against turning with said screw, said apparatus having a plastic compound escapement orifice leading from the interior thereof to the atmosphere at a location between said pressure creating unit and said nozzle, valve means for controlling the flow of plastic compound through said passage and from said escapement orifice, said valve means being so constructed and arranged as to open and close said escapement orifice as said passage is closed and opened, respectively, and mechanism for operating said valve means including means responsive to said separatory movement of said nozzle and forming device for shifting said valve means to close said passage and open said escapement orifice while said nozzle is still in pressure communicating position with respect to said inlet of said forming device to facilitate the use of said nozzle as a temporary plug for said inlet of said forming device after the pressure in said apparatus has been relieved by flow of plastic compound from said escapement orifice.

20. The method of molding heat curing plastic compound which comprises the steps of injecting successive mold filling charges of said compound under pressure through a passage communicating with an inlet of said mold from a source of said compound under pressure, discontinuing the application of and relieving at least some of the pressure on the compound in said source and within said passage by venting the same to the atmosphere while retaining said pressure on the compound within said mold after said mold is filled and prior to solidification of the compound in said inlet in order to guard against setting of said compound at said source and in said passage between successive mold filling discharges, and heating said mold to cure the compound therein.

21. Apparatus for discharging material under pressure comprising a housing, a cylindrical bore in said housing, an inlet chamber at one end of said bore adapted to supply material thereto, said inlet chamber being greater in transverse cross sectional area than said bore, a discharge chamber at the other end of said bore for receiving material under pressure therefrom, a conveyor-like screw extending through at least a portion of said inlet chamber and through said bore and having a thread disposed in relatively close fitting relationship with respect to the wall of said bore, said housing being provided with oppositely spaced recesses extending radially outwardly from said bore at a location intermediate the ends of said bore and each of said recesses having a continuous enclosing wall provided with a single opening communicating with said bore at a location spaced from the junction of said bore and inlet chamber a distance corresponding to more than one complete turn of the thread of said screw, whereby direct communication in an axial direction between said recesses and said inlet chamber is prevented in all angular positions of said screw, a gear-like member rotatably mounted in each of said recesses having teeth adapted to extend through said opening and mesh successively with said thread at said latter location thereon, means rotatably supporting said gear-like members at a fixed distance from the axis of said screw, and means at the inlet chamber end of said housing for driving said screw to transfer material from said inlet chamber to said discharge chamber under pressure, said gears being drivingly rotated by said screw for successively bringing the respective teeth thereof into obstructing relation to turning of said material with said screw while returning material carried between the teeth of said gears to a location in said bore at which such material is under pressure.

22. In combination, a mold having an inlet opening; and an apparatus for injecting heat curable plastic compound into said inlet opening, comprising a housing having a heating chamber therein, means in said housing for propelling said plastic compound through said heating chamber under pressure, a nozzle member at the outlet end of said chamber engaging and communicating with the inlet opening of said mold for filling the latter, said nozzle having a main discharge passage extending from said chamber to said mold inlet opening and having an escapement passage leading to the atmosphere from said main discharge passage, said nozzle and mold being relatively movable to separate the same in response to back pressure acting on said nozzle after said mold is completely filled, a valve in said main discharge passage having port means and a dual purpose wall portion adapted when said valve is in closed position to obstruct back flow of plastic compound from said mold into said main discharge passage after the mold is filled, said port means at such time establishing communication between said heating chamber and said escapement passage, and to obstruct said escapement passage when said valve is in open position, said port means at such latter time establishing communication between said heating chamber and said main discharge passage of said nozzle, and mechanism for operating said valve including means operable in response to said separatory movement of said nozzle and mold and while said nozzle is in obstructing relationship with respect to back flow of plastic compound from said mold inlet for shifting said valve to its first-mentioned position to close said main discharge passage and open said escapement passage.

23. In combination, a stationary heated mold having an upper face with an inlet opening formed therein; and an apparatus for injecting heat curable plastic compound into said inlet opening, comprising an injecting unit including a discharge nozzle and pressure creating means for forcing plastic compound through said nozzle under pressure, and means shiftably mounting said injecting unit above said mold and accommodating movement of said nozzle into and out of mold filling relation with respect to said mold inlet opening, said mounting means being arranged so that said nozzle is yieldably urged toward said mold by gravity and movable away from said mold by back pressure applied on said nozzle when said mold is completely filled and while said pressure creating means is performing a discharge operation, whereby to accommodate the formation of a heat insulating film of plastic compound between said nozzle and said mold after said mold is filled.

24. A method of molding a composition of the type which hardens when it is heated at a predetermined temperature for a predetermined period, which comprises the steps of forcing said composition in a heated and plastic state from a storage space into a heated molding space by means of high pressure which is applied on the composition in said storage space, said composition being forced through a restricted channel in its travel toward said mold, discontinuing the application of pressure on the composition in said storage space substantially immediately after said molding space has been filled and simultaneously relieving the pressure in said storage space by allowing some of said composition to flow slowly therefrom to the atmosphere prior to solidification of said composition in said channel, and maintaining the pressure in said channel and in said molding space for a period of time sufficient to cause the composition in said channel to become at least partially solidified and to cure the composition in said molding space.

25. Apparatus for discharging material under pressure comprising housing means having a bore serving as a pressure chamber and provided with an outwardly flared inlet at one end, a supply chamber adjacent the inlet end of said bore for receiving material to be operated upon in said pressure chamber, a discharge chamber at the opposite end of said bore having an outlet opening, a rotatable screw member extending through said bore having a plurality of turns of its groove enveloped by the wall of said bore and including a portion extending into said supply chamber, opposite wall portions of said bore each having an externally closed slot therein communicating with the interior of said bore at a location spaced from said flared inlet a distance corresponding to more than one complete turn of the thread of said screw member, whereby direct communication in an axial direction between said slots and said inlet of said bore is prevented in all angular positions of said screw, means extending through said slots into said bore and into the thread of said screw member for positively holding material propelled by the latter against turning with said screw member in order that said material will be propelled by said screw member in the direction of its axis, and mechanism at the supply chamber end of said housing means for drivingly rotating said screw member.

26. In combination, a heated mold having an inlet opening; and an apparatus for injecting heat curable plastic compound into said inlet opening, comprising an injecting unit including a discharge nozzle and pressure-creating means for forcing plastic compound through said nozzle under pressure, and means for positioning said nozzle and mold with respect to each other and supporting said nozzle and mold for automatic relative shifting movement upon completion of the filling of said mold with said plastic compound by said pressure creating means, said positioned means being so constructed and arranged as to yieldably bias said nozzle and mold toward each other during mold filling operations and to accommodate relative shifting movement of said nozzle and mold in a separatory direction in response to back pressure acting upon said nozzle after said mold is filled, whereby to permit the formation of a heat-insulating film of said plastic material between said mold and nozzle under the pressure to which said plastic material is subjected by said pressure creating means after said mold has been completely filled.

27. In combination, a mold having an inlet opening; and an apparatus for injecting plastic compound into said inlet opening, comprising an injecting unit including a discharge nozzle and pressure-creating means for forcing plastic compound through said nozzle under pressure, means for positioning said nozzle in engagement with the inlet opening of said mold and supporting said nozzle and mold for relative separatory shifting movement, said means being so constructed and arranged as to yieldably bias said nozzle and mold toward each other during mold filling operations and to accommodate relative shifting movement of said nozzle and mold in a separatory direction in response to the backing up of the plastic compound to form a film between the mold and nozzle after said mold has been completely filled under the pressure to which said plastic compound is subjected by said pressure-creating means, a valve controlling the flow of plastic compound from said nozzle into said mold, and valve operating mechanism actuable in response to said relative separatory movement for effecting shifting of said valve to closed position while said nozzle is still in pressure communicating relation with said inlet opening of said mold.

28. In combination, a mold having an inlet opening; and apparatus for injecting a moldable compound into said inlet opening including an injecting unit comprising a nozzle having a discharge passage communicating with said inlet opening, means in said unit for discharging said compound under pressure through said passage, mechanism for driving said means, said mold and nozzle being relatively movable to separate the same in response to back pressure on said nozzle upon complete filling of said mold, and a control system for said driving mechanism including means actuated in response to said relative separatory movement of said mold and nozzle for discontinuing operation of said driving mechanism after said mold has been filled.

WALTER P. COUSINO.